US011525480B2

(12) United States Patent
Vadder

(10) Patent No.: US 11,525,480 B2
(45) Date of Patent: Dec. 13, 2022

(54) BEARING PROTECTOR

(71) Applicant: Evapco, Inc., Taneytown, MD (US)

(72) Inventor: Davey Joe Vadder, Westminster, MD (US)

(73) Assignee: Evapco, Inc., Taneytown, MD (US)

( * ) Notice: Subject to any disclaimer, the term of this patent is extended or adjusted under 35 U.S.C. 154(b) by 0 days.

(21) Appl. No.: 17/190,306

(22) Filed: Mar. 2, 2021

(65) Prior Publication Data
US 2021/0215199 A1    Jul. 15, 2021

Related U.S. Application Data

(63) Continuation-in-part of application No. 16/539,118, filed on Aug. 13, 2019, now abandoned.

(60) Provisional application No. 62/718,234, filed on Aug. 13, 2018.

(51) Int. Cl.
*F16C 33/66* (2006.01)
*F16C 33/78* (2006.01)
*F16C 43/04* (2006.01)
*F16C 33/72* (2006.01)
*F16C 35/04* (2006.01)

(52) U.S. Cl.
CPC ........ *F16C 33/6618* (2013.01); *F16C 33/723* (2013.01); *F16C 33/7886* (2013.01); *F16C 35/047* (2013.01); *F16C 43/045* (2013.01)

(58) Field of Classification Search
CPC ...... F16C 33/6618; F16C 33/72; F16C 33/76; F16C 33/7886; F16C 35/00; F16C 35/047; F16C 43/04; F16C 43/045; F16C 33/723
See application file for complete search history.

(56) References Cited

U.S. PATENT DOCUMENTS

| | | | | | |
|---|---|---|---|---|---|
| 4,659,240 | A | * | 4/1987 | Rogus | F16C 33/72 384/152 |
| 4,708,498 | A | * | 11/1987 | Labedan | F16C 33/60 384/570 |
| 2017/0291351 | A1 | * | 10/2017 | Boehm | B29C 63/22 |

* cited by examiner

*Primary Examiner* — Alan B Waits
(74) *Attorney, Agent, or Firm* — Whiteford, Taylor & Preston, LLP; Peter J. Davis

(57) ABSTRACT

A split bearing protector with a flexible design that adds improved moisture protection to a bearing and can be installed without removing the bearing from the machine in which it is installed.

4 Claims, 5 Drawing Sheets

BEARING PROTECTOR

FIELD OF THE INVENTION

This invention relates to bearing seals.

BACKGROUND OF THE INVENTION

Ball bearings are commonly used to support vertical shafts for air moving fans in cooling equipment like cooling towers. When these bearings are used in service outdoors, especially in a saturated cooling tower environment, they are subject to water condensation and subsequent infiltration past the seal which leads to premature bearing lubrication failure, corrosion, and ultimately mechanical failure. Bearing "slingers" and "flingers" are commonly used in these applications to reduce water infiltration into the bearings.

But these prior art bearing protectors have had limited success. None of the prior art bearing protectors are easily installed or replaced on existing equipment, and many designs fail to adequately protect the bearing from water condensation and only serve to reduce water ingress from falling rain. Other designs are only compatible with one type or a special type of bearing.

SUMMARY OF THE INVENTION

This invention serves to solve the problems of the prior art by providing a close-fitting through-shaft secondary protective grease seal and be installed on multiple common bearing brands without removing the shaft from the bearing.

According to various embodiments of the invention, a bearing protector is presented having a generally radially or annular shaped housing that is configured to fit snugly around the shaft and the bearing assembly (i.e., around locking collar of the bearing and over the outer race of the bearing), but which, when fastened to the bearing assembly and shaft, creates a space between the bearing assembly and the bearing protector which space may be filled with protective grease. The annular housing is not continuous, but is characterized by a first and second end which abut each other when fastened to the shaft and bearing assembly. The annular housing is sufficiently flexible so that its annular shape can be opened, for example by spreading or twisting, separating the first and second ends, so that it can be placed around the shaft and the bearing without removing the shaft from the bearing. Once the protector has been fitted about the bearing and the shaft and allowed to relax, the first and second ends of the protector will abut or nearly abut one-another, and may be fixed tightly to one-another by snap fit, screw, nut and bolt, or any other fixation method and/or device.

According to another embodiment of the invention, a bearing protector is formed by a radial cup-like structure whose internal diameter closely matches the bearing locking collar or inner race extension and fits over and is attached to the bearing locking collar, extended inner race, shaft, or combinations thereof. This cup-like structure radiates down and outward toward and close to the bearing outer race. A cavity is formed between the primary bearing seal and this structure, or bearing protector. This cavity receives grease through the bearing primary seal which is located on the face of the bearing. This cavity is filled with grease expelled from the primary bearing seal and displaces water and/or contaminants that would normally be in contact with the primary bearing seal. The bearing protector is "slit" down one side, enabling it to be deformed into an open position to be placed on a shaft laterally without access to the end of the shaft. The protector may be fastened to the bearing locking collar or extended inner race by friction, by screw, but bolt and nut, by snap fit, or by any known fastening means.

According to various embodiments of the invention, the bearing protector may be manufactured from Acrylonitrile styrene acrylate ("ASA"), making the product suitable for 3D printing in addition to other manufacturing methods including injection molding. The foregoing is not intended to limit the invention to any particular material or method of manufacture, provided that the product has sufficient flexibility to be opened around a shaft for installation yet be sufficiently firm to maintain shape and performance following installation.

DESCRIPTION OF THE DRAWINGS

The detailed description of the preferred embodiments of the present invention refers to the attached drawings, wherein.

Figure 1:
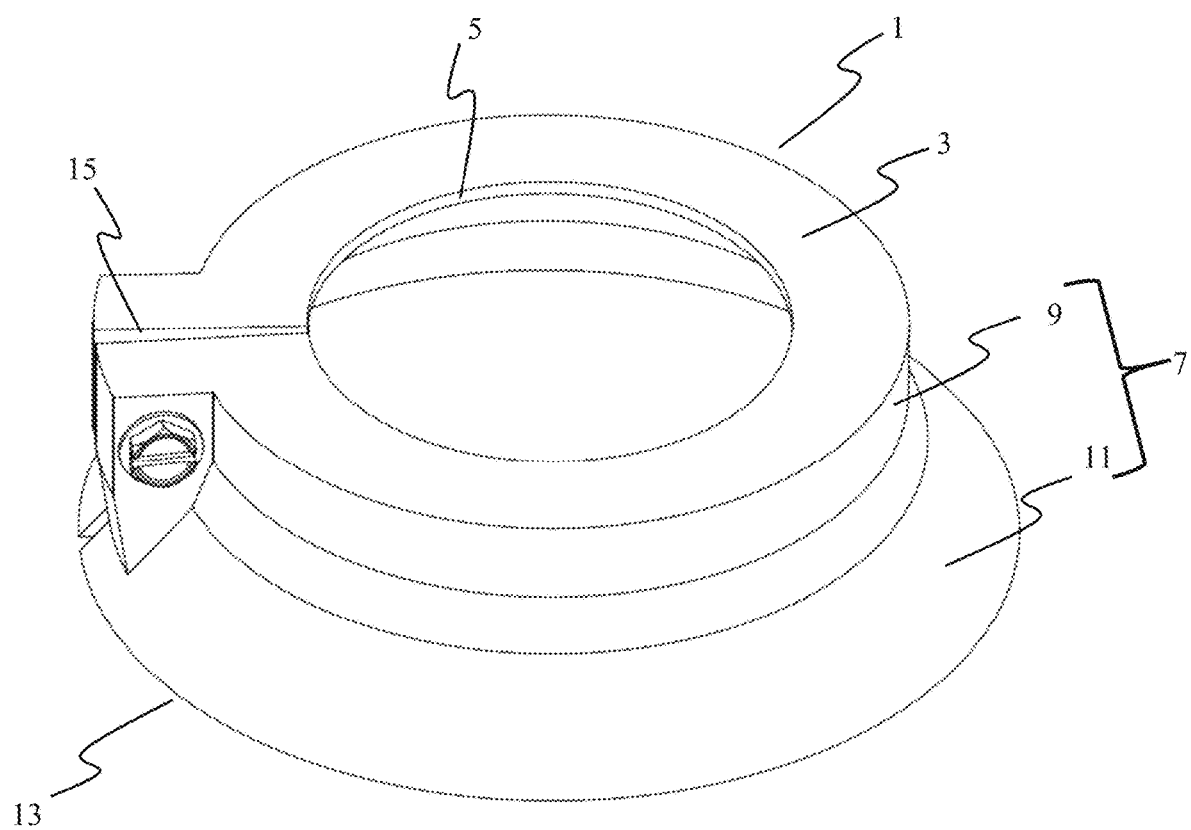
FIG. 1 shows a perspective view of a bearing protector according to an embodiment of the invention.

Features in the attached drawings are numbered with the following reference numerals:

| | |
|---|---|
| 1 Bearing Protector | 9 Locking Collar Portion |
| 3 Front Face | 11 Conical Flange Portion |
| 5 Shaft Facing Surface | 12 Cavity |
| 7 Side Face | 13 Outer Race Facing Surface |
| 14 Bearing Outer Race | 17 First End |
| 15 Slit/Opening | 18 Secondary Grease Seal |
| 16 Primary Bearing Seal | 19 Second End |

DETAILED DESCRIPTION OF THE PREFERRED EMBODIMENTS

Referring to FIG. 1, bearing protector 1 may be formed by an annular cup-like structure having a front face 3 defining an annular shaft facing surface 5 and a side face 7, having a locking collar portion 9, a conical flange portion 11, and an outer race facing surface 13. The inner diameter of the locking collar portion 9 may be configured to closely match the shape and outer diameter of the bearing locking collar, inner race extension, or shaft so as to snugly fit over it during installation and use. The conical flange portion 11 extends down and away from the locking collar portion 9 and terminates at the outer race facing surface 13. The annular shape of the bearing protector 1 is interrupted by a slit or opening 15 bound by first and second ends 17, 19 of the annular bearing protector 1.

Figure 2:
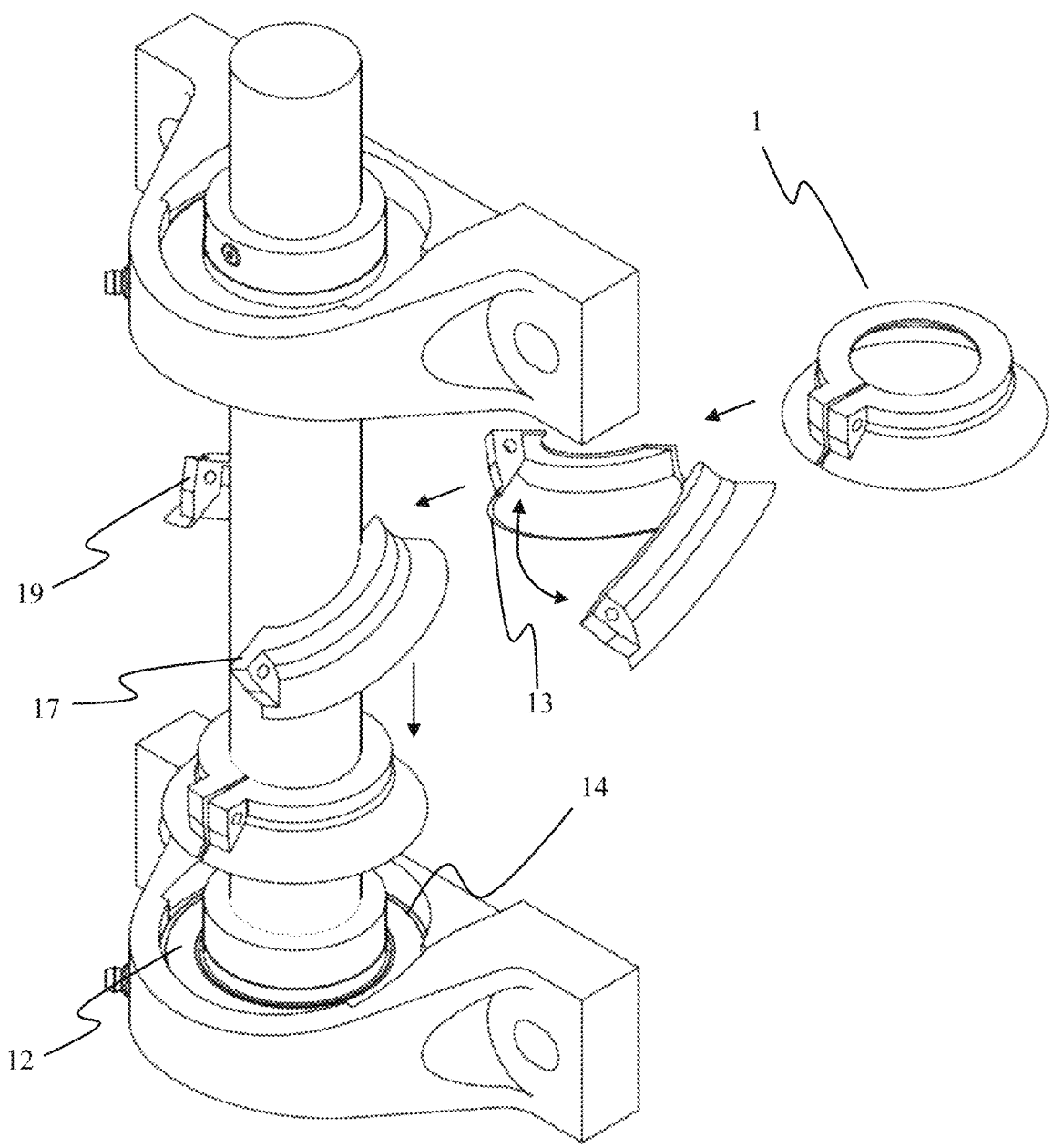
FIG. 2 shows a first step in a method for installation of a bearing protector according to an embodiment of the invention by deforming and opening the slit construction.
Figure 3:
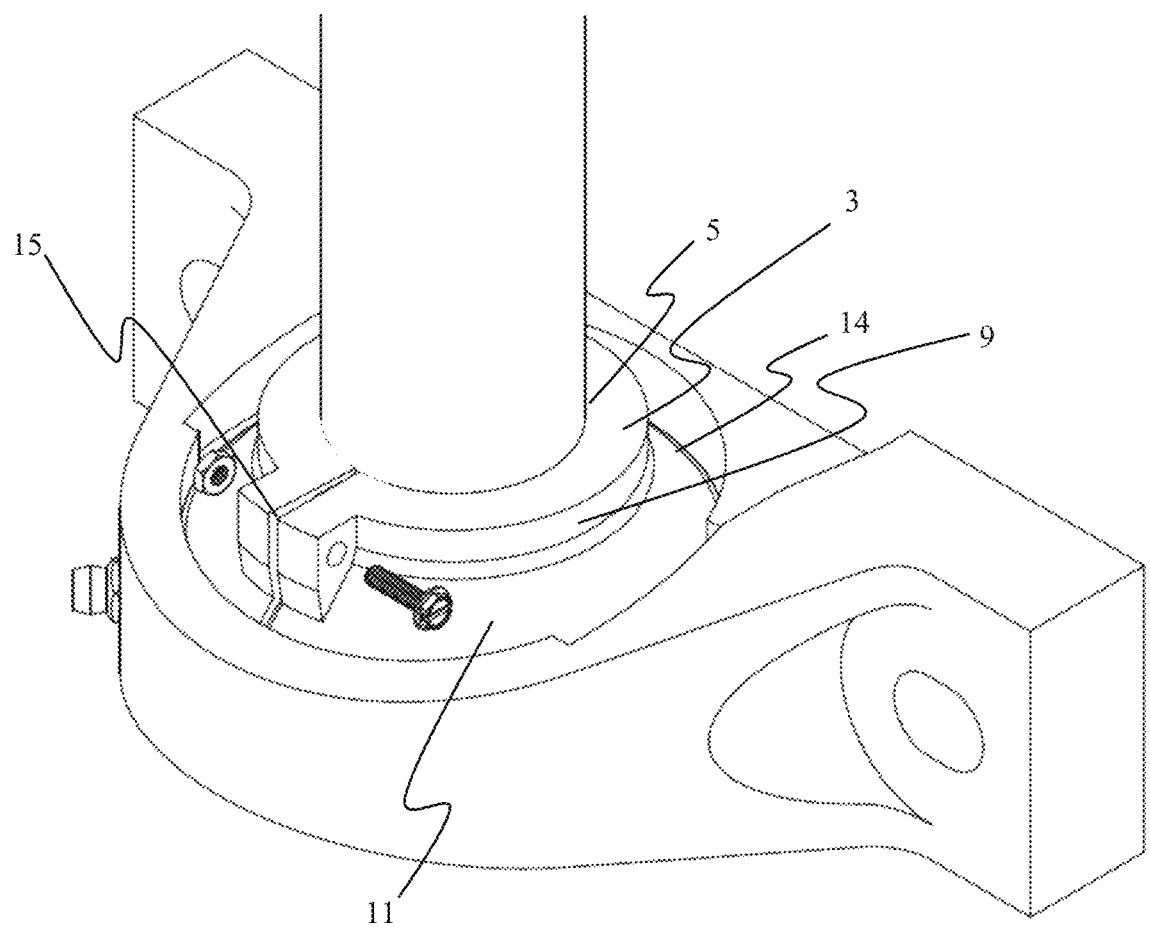
FIG. 3 shows a second step in a method for the installation of a bearing protector according to an embodiment of the invention.
Figure 4:
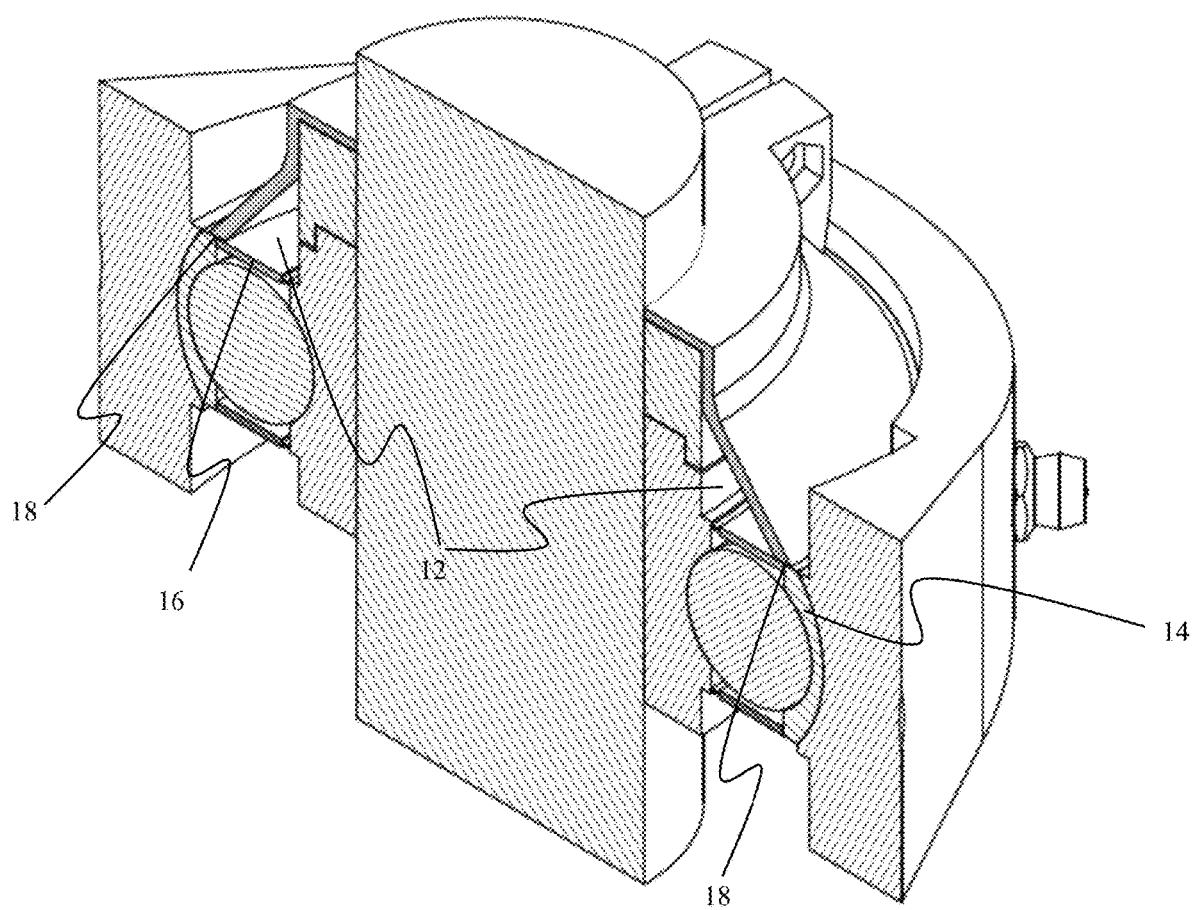
FIG. 4 shows the grease cavity formed between the primary bearing seal and bearing protector according to an embodiment of the invention.
Figure 5:
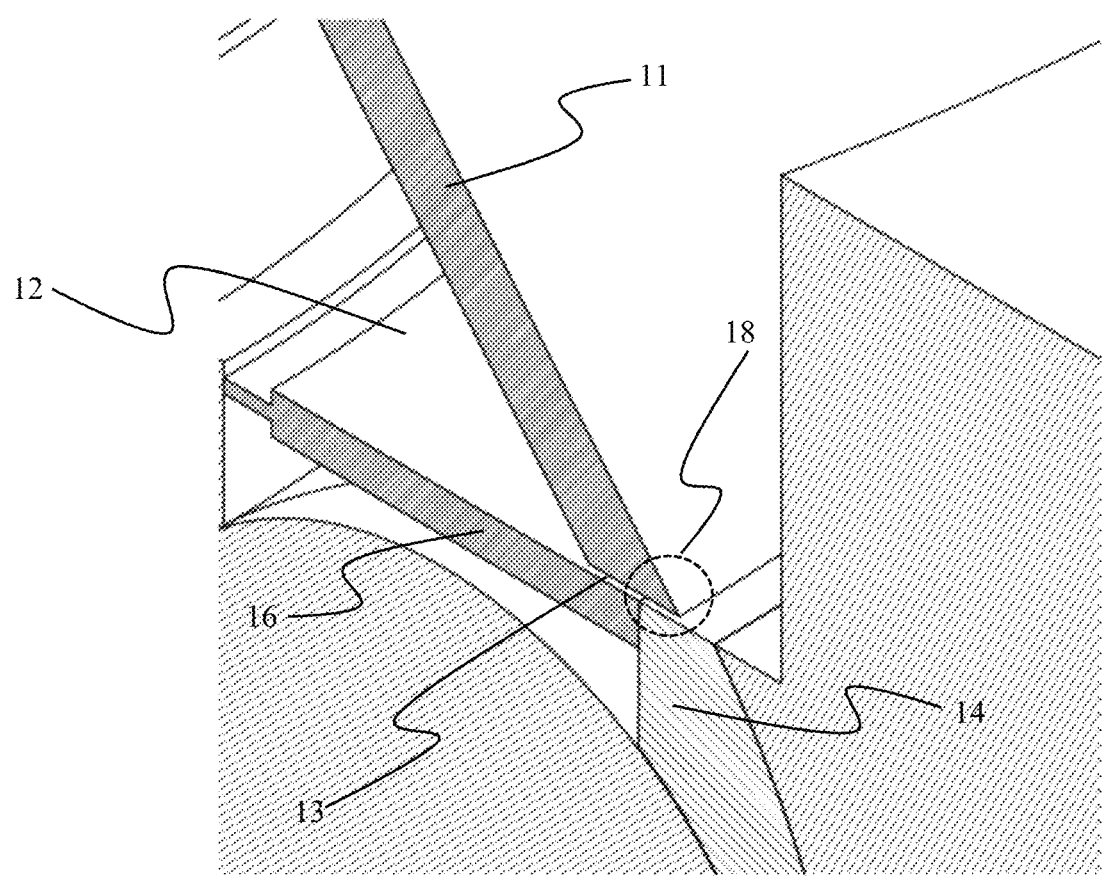
FIG. 5 shows close-up detail of the secondary grease seal formed between the primary bearing outer race and bearing protector according to an embodiment of the invention.

The bearing protector 1 of the invention is sufficiently flexible that it may be twisted so that first and second ends 17, 19 may be separated a distance sufficient to allow passage of the shaft there-between, permitting installation and removal of the bearing protector without separating the bearing from the shaft. See, FIG. 2. Once the protector 1 has been placed around the shaft with the shaft facing surface 5 snugly fitted around the shaft, it may be pressed down over the locking collar and a surface of the outer race, as shown in FIG. 3. FIG. 4 shows the conical (triangular in cross section) cavity 12 defined by the inside surface of the conical flange portion 11, and the bearing primary seal 16. This cavity is filled with grease that is expelled from the bearing primary seal when the bearing is lubricated. This cavity shown close-up in FIG. 5. The primary bearing seal 16 contacts the inner and outer race surfaces that abut the bearing. When cavity 12 is filled with grease, outer race facing surface 13 and bearing outer race 14 form a secondary grease seal 18. This secondary grease seal reduces exposure of contaminants to the primary bearing seal 16. Secondary seal 18 is close tolerance, non-contact, grease-filled gap of 0.0005" to 0.010".

First and second ends 17, 19 may be securely fixed to one-another by bold and nut, screw, snap fit or other known fixation method or structure. When installed about a shaft and bearing assembly, a cavity is formed between the bearing face and the inside surface of the conical flange portion 11. This cavity receives grease through the bearing primary seal which is located on the face of the bearing. This cavity is filled with grease expelled from the primary bearing seal and displaces water and/or contaminants that would normally be in contact with the primary bearing seal.

The invention claimed is:

1. A bearing protector comprising
   an annular structure having a front face defining an annular shaft contacting surface, and
   a side face, said side face comprising a locking collar portion and a conical portion,
   wherein an inner diameter of the locking collar portion is configured surround an outer diameter of a bearing locking collar,
   wherein the conical portion extends axially and away from the locking collar portion and terminates at an outer race-facing surface, and
   wherein the annular structure of the bearing protector is interrupted by a slit which defines a first end and a second end of the annular structure,
   and wherein an inside surface of said conical portion and said bearing define a conical cavity configured to receive grease expelled from said bearing, and wherein said outer race-facing surface and a surface of said race form a non-contact grease-filled gap.

2. The bearing protector of claim 1, configured to be twisted so that said first and second ends may be displaced from one-another to allow passage of a shaft there-between.

3. The bearing protector of claim 1, further comprising means to securely fix said first end to said second end.

4. A method of protecting a shaft bearing, comprising:
   providing an open ring-shaped flexible bearing protector,
   said open-ring-shaped flexible bearing protector comprising an annular structure having a side face comprising a conical portion having an end that terminates at an outer race-facing surface, and
   deforming said open ring-shaped flexible bearing protector to separate first and second ends of said open ring shaped flexible bearing protector to allow passage of a shaft,
   fitting said open-ring shaped flexible bearing protector about said shaft and said shaft bearing, abutting said first and second ends to one-another, and
   affixing them to one-another to prevent movement of said open ring-shaped flexible bearing protector and create a cone-shaped cavity between said conical portion, said outer race-facing surface, and said shaft bearing,
   said cavity configured to receive grease from said bearing and prevent leakage of said grease from an interior thereof.

\* \* \* \* \*